United States Patent [19]

Pape et al.

[11] Patent Number: 4,460,962
[45] Date of Patent: Jul. 17, 1984

[54] ANTI-SKID BRAKE CONTROL SYSTEM
[75] Inventors: Klaus Pape; Gerhard Ruhanu, both of Hanover, Fed. Rep. of Germany
[73] Assignee: WABCO Fahrzeugbremsen GmbH, Hanover, Fed. Rep. of Germany
[21] Appl. No.: 420,412
[22] Filed: Sep. 20, 1982
[51] Int. Cl.$^3$ .............................................. B60T 8/08
[52] U.S. Cl. ...................................... 364/426; 303/95; 303/96; 303/105
[58] Field of Search .............. 364/426; 303/92, 95–97, 303/105, 106

[56] References Cited
U.S. PATENT DOCUMENTS

| | | | |
|---|---|---|---|
| 3,820,857 | 6/1974 | Schnaibel et al. | 303/105 |
| 4,109,234 | 8/1978 | Davis | 303/92 X |
| 4,230,375 | 10/1980 | Leiber | 303/105 |

Primary Examiner—G. Z. Rubinson
Assistant Examiner—Saul M. Bergmann
Attorney, Agent, or Firm—J. B. Sotak

[57] ABSTRACT

An anti-skid vehicle brake control system having a sensor for monitoring and producing electrical signals corresponding to the speed of a vehicle wheel. The electrical speed signals are processed by a first microcomputer circuit for forming data words. The data words are fed to a filter network which includes a parallel-connected exponential, linear, and percentile filter section for suppressing interference pulses. The filtered data words are fed to a second microcomputer circuit which produces control signals. The control signals are fed to a solenoid valve which controls a brake cylinder on the vehicle.

7 Claims, 5 Drawing Figures

ANTI-SKID BRAKE CONTROL SYSTEM

FIELD OF THE INVENTION

The invention relates to an anti-skid brake control system and more particularly to an arrangement for filtering interference pulses from digital data words by using exponential, linear and percentile filters which are selectively activated and deactivated by a control circuit in accordance with input signals furnished by a pair of microcomputers to supply control signals to a solenoid valve which control the brake cylinder on a vehicle.

BACKGROUND OF THE INVENTION

In certain speed sensing systems, interference or noise pulses are developed in the output signals produced by wheel sensors. These interference pulses normally consist of individual voltage spikes which are produced by various switching operations in the electrical power supply and which are coupled throughout the entire electrical system of the vehicle. It has been found that extremely large or high-power interference pulses are generated during the switching of inductive loads, such as the anti-skid solenoid control valves. Thus, it will be appreciated that the anti-skid brake control system, itself, can interfere with the operation of the pick-up of the speed measuring signals.

These transients have a particularly detrimental effect in those anti-skid brake control systems which utilize a digital type of pick-up and processing of the speed measured signals. In practice, the interference pulses are superimposed on the sensor signals. Thus, if the transients occur in the vicinity of the crossover points, they will cause the faulty triggering of the cycle counters which are included in the input circuit. During the digital retrieval of the speed measurement, the interference pulses are also processed by the logic circuitry for a radical change in the speed of the monitored wheel.

By contrast, an analog speed measurement system uses a frequency-to-voltage converter and, as a result of the overall behavior of the converter, the interference pulses will have little, if any, effect on the speed measurements.

A simple method of filtering digital information consists of not using a data word which deviates from the preceding word by more than a certain amount. However, such a filtering method is unacceptable for an anti-skid brake control system since a valid measured vehicular speed can vary by a greater or lesser degree.

OBJECTS AND SUMMARY OF THE INVENTION

Accordingly, it is an object of this invention to provide a circuit arrangement for a digital filter which is particularly suited for the filtering of speed words in an anti-skid brake control system.

Another object of this invention is to provide an anti-skid brake control system which includes a digital filter network for suppressing interference pulses.

A further object of this invention is to provide an anti-skid vehicle braking arrangement having a filtering circuit which includes an exponential filter section, a linear filter section, and a percentile filter section for subduing noise signals.

Yet a further object of this invention is to provide an interference suppressing network for an anti-skid brake control system which is simple in design, economical in cost, and effective in operation.

In accordance with the present invention, there is provided an anti-skid vehicle brake control arrangement having at least one sensor for sensing the speed of the wheel of a vehicle, and having an electronic system which converts the speed signals into control signals for controlling a solenoid valve which is connected to a brake cylinder characterized by, a first microcomputer for receiving the speed signals from the sensor and for converting the speed signals into digital data words, a filter circuit connected to the first microcomputer, the filter circuit having an exponential characteristic filter section, a linear characteristic filter section, and a percentile characteristic filter section, a control circuit connected to the filter circuit for activating at least one of the filter sections of the filter circuit for filtering the digital data words when an interference pulse occurs on the speed signals of the sensor, and a second microcomputer connected to the control circuit for producing anti-skid control signals from the filter digital data words.

BRIEF DESCRIPTION OF THE DRAWINGS

The above objects and other attendant features and advantages will be more readily appreciated as the subject invention becomes better understood by reference to the following detailed description when considered in conjunction with the accompanying drawings, wherein.

DETAILED DESCRIPTION OF THE DRAWINGS

Figure 1:
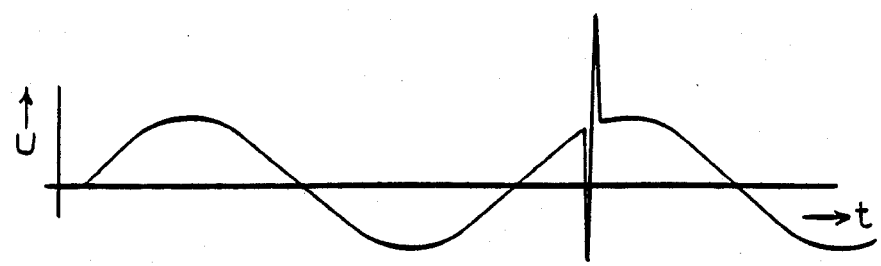
FIG. 1 shows a typical sine-wave curve of a wheel sensor output signal with a single interference pulse superimposed thereon.

Referring now to the drawings and, in particular, to FIG. 1, there is shown the output voltage of a conventional wheel sensor. The generated output voltage is normally sinusoidal. Now if an interference pulse occurs, a high-intensity voltage spike is superimposed on the sine-wave signal as illustrated in FIG. 1. In order to produce data words in a digital processing system, the distance between the crossover points of the sensor output voltage is measured to determine the speed of the vehicle. The shorter this distance is, the faster the measured wheel is turning. It will be observed, from FIG. 1, that, as a result of the appearance of the interference pulse, there is suddenly a much shorter time between two successive voltage crossover points. It will be appreciated that without any filtering, this would be interpreted by the subsequent electronic processing equipment as an increase in speed which would be the sequence data word. Therefore, the data word would simulate a speed which is much too high.

Figure 2:
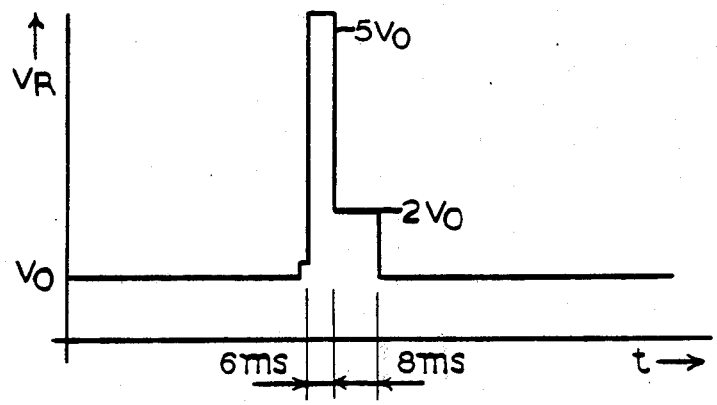
FIG. 2 illustrates a digital data word which is distorted by the inteference pulse shown in FIG. 1.

Referring now to FIG. 2, there is shown a consequential interference on the data word. It can be clearly seen that following a brief initial introductory period, there appears a very large transient voltage. This large transient causes the speed data to increase greatly over the correct speed $V_O$, for example, a multiple of five times $V_O$. Then the speed data falls to a value which is twice $V_O$. Assuming a sensor frequency of 75 Hz, which corresponds to a vehicle speed of about 9 km/h, and a measurement rate of 2 ms, the large transient voltage will last about 6 ms, and the smaller transient voltage will last about 8 ms. It will be appreciated that such interferences which occur during the presence of the data words will cause the anti-skid braking system to produce a corresponding erroneous output control signal. Therefore, it is essential to eliminate the interference pulses by digital filtering the speed signals. The proposed arrangement for accomplishing this purpose in the present invention is based upon an analysis of the types of interferences which occur in an anti-skid brake control system and by utilizing the filtering methods which are available in the electronic art. The present electronic filter network is based on a combination of three types of parallel filters, which smoothly transitions into each other's characteristic curves.

Figure 3:
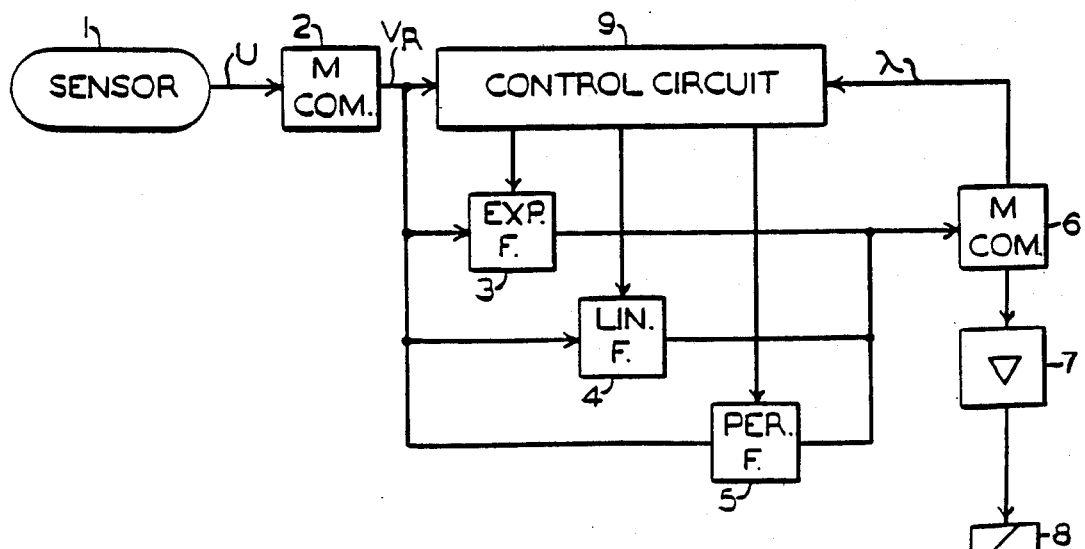
FIG. 3 shows a schematic block diagram of a digital anti-skid brake control system for filtering of the digital data words.

Referring now to FIG. 3, there is shown a digital electronic anti-skid brake control system employing a triple filter network.

The velocity or speed of a vehicle wheel is sensed or monitored by a sensor 1. This gives an analog-type of sinusoidal alternating current voltage U as shown in FIG. 1. This analog a.c. voltage is converted by a first microcomputer 2 into a digital word which is representative of the given wheel speed. This data word is then fed to the inputs of each filter section of the filter network. The three-stage filter network includes an exponential characteristic sectional exponential filter 3, a linear characteristic section, linear filter 4, and a percentile characteristic section, percentile filter 5. The exponential filter 3 is designed to have a square-law characteristic. The data word which is obtained from the filter network is conveyed to a second where it is converted, according to determined criteria into a sequence of cut-in or turn-on and cut-out or turn-off control signals. These control signals are amplified by a driver circuit 7 and, in turn, are conveyed to a solenoid control valve 8. The solenoid valve 8 is connected to the pneumatic pressure line which leads to the brake cylinder of the controlled wheel so that the brakes may be applied or released in accordance with the control signals.

The three filters, 3, 4, and 5, are not continuously active, but are turned on according to determined criteria explained below by a control mechanism 9. The unfiltered data word $V_R$ from the first microcomputer 2, and a data word for the wheel slip from the second microcomputer 6 are fed to the inputs of a control circuit 9.

The function of each of the digital filter sections 3, 4, and 5 can be most clearly described by their behavior in the presence of a transient during the monitoring of the wheel speed. The graphical representation of the unfiltered and filtered response is illustrated in FIG. 4, with the unfiltered speed being shown as curve 10 and the filtered speed being shown as curve 11.

Figure 4:
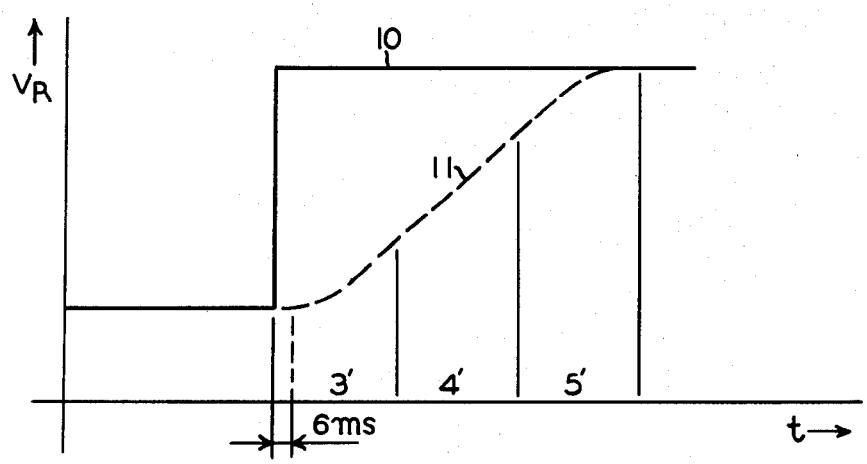
FIG. 4 shows the transient response of the digital filter used in FIG. 3.

In viewing FIG. 4, it will be seen that, upon the occurrence of a transient, the exponential filter 3 is activated for a period of time covering range 3'. The slope of the filter 3 initially begins at zero and then continuously increases. This results in an exponential rise in the speed. It will be observed that single interference pulses which generally last, for example, a 6 ms duration will fall in the range having a 0 slope and are thereby suppressed.

As soon as the slope of the curve reaches a predetermined level, namely, range 4', the slope will no longer increase. The speed in range 4' thereby continues to increase with a linear characteristic as exhibited by filter section 4.

The adjacent range 5' is the zone of the percentile filter 5. If a correction value used for filtering exceeds a percentage, e.g., 25% of the speed difference between the unfiltered and filtered speed, then the correction value is set at this percentage of the difference. Thus, the slope of the curve begins to decrease.

In viewing the transient response, it will be seen that, theoretically, the curve is analogous to an analog filtering of a higher order.

The above-described filtering may, however, be too pronounced for the normal control curve of an anti-skid brake control system. Therefore, in cases where only small speed transients are present a first exception is made whereby, only the ranges of the linear and percentile filters are used. This corresponds to a filtering of the first order with a slope limitation.

Also, the criterion for utilizing the exponential filter is determined by the size of the speed transient. If the jump of the unfiltered speed is greater than +75% or −37.5%, and if the speed is simultaneously more than 10 km/hr, then the exponential filter 5 is utilized. This is accomplished by initiating an appropriate control pulse by the control circuit 9.

Figure 5:
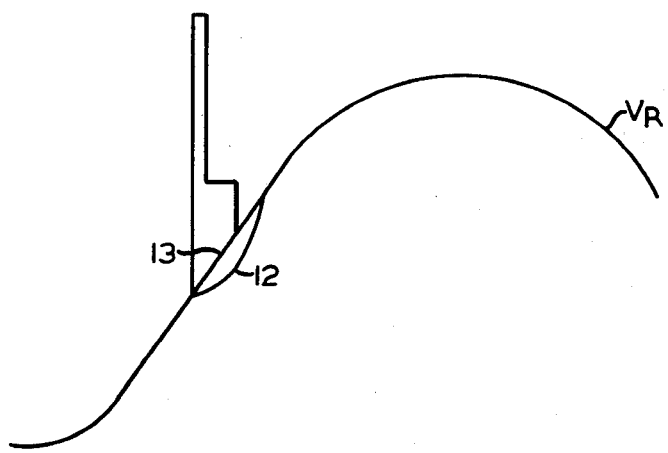
FIG. 5 shows an acceleration curve of the filtered wheel speed data.

Likewise, a second expection is made whereby the exponential section is excluded. If a λ slip-signal is present and the speed transient is in the negative direction, then the exponential filter is not activated. As a result of the above filtering, the effect of individual interference pulses is completely suppressed so that no unwanted control signals are produced. An interference pulse may have an adverse effect on the control signals when the interference pulse happens to occur during a wheel acceleration operating phase. If a single interference pulse occurs during a wheel acceleration phase, then the resulting curve for the wheel speed $V_R$ caused by the interference takes the form of curve 12 as shown in FIG. 5.

There is a possibility of utilizing the exponential filtering at some other level than at a zero slope, namely, at a slope which corresponds to the slope of acceleration curve of the wheel by initiating a control immediately upon the occurrence of the interference. This produces a filtered curve for the wheel speed which corresponds to the unaffected speed 13. Therefore, the control signals will remain unaffected.

It will be apparent that various changes and modifications may be made by those skilled in the art without departing from the spirit and scope of the subject invention. Therefore, it will be understood that certain alterations, ramifications, and equivalents will be readily apparent to those persons skilled in the art, and, accordingly, it is understood that the present invention should not be limited to the exact embodiment shown and described, but should be accorded the full scope and protection of the appended claims.

Having now described the invention, what we claim as new and desire to secure by Letters Patent, is:

1. An anti-skid vehicle brake control arrangement having at least one sensor for sensing the speed of a wheel of a vehicle and producing speed signals in accordance therewith, and having an electronic system which converts the speed signals into control signals for controlling a solenoid valve which is connected to a brake cylinder, characterized by, (a) a first microcomputer for receiving the speed signals and said sensor for converting the speed signals into digital data words, (b) a filter circuit connected to the first microcomputer, said filter circuit having an exponential characteristic filter, a linear characteristic filter, and a percentile characteristic filter, (c) a control circuit connected to said filter circuit for activating at least one of said filters of said filter circuit for filtering said digital data words when an interference pulse occurs on the speed signals of said sensor, and, (d) a second microcomputer connected to said control circuit for producing anti-skid control signals from the filtered digital data words.

2. The anti-skid vehicle brake control arrangement as defined in claim 1, wherein said exponential filter section has an initial slope of zero, and is activated by said control circuit when the interference pulse simulates a speed greater than 10 km/h.

3. The anti-skid vehicle brake control arrangement as defined in claim 1, wherein said exponential filter section is activated by said control circuit when the interference pulse simulates a speed greater than +75% or −37.5% of the actual speed.

4. The anti-skid vehicle brake control arrangement as defined in claim 1, said exponential filter section remains inactivated when a slip signal appears in said second microcomputer circuit, and the interference pulse simulates negative going speed.

5. The anti-skid vehicle brake control arrangement as defined in claim 1, wherein said linear filter is deactivated by said control circuit as soon as the difference between the unfiltered speed and the filtered speed put out by the first microcomputer circuit falls below a determined amount.

6. The anti-skid vehicle brake control arrangement as defined in claim 1, wherein the characteristic of said exponential section has an initial slope which corresponds to the acceleration of the wheel being measured during the occurrence of the interference pulse.

7. The anti-skid vehicle brake control arrangement as defined in claim 1, wherein said control circuit activates and deactivates said filter sections in accordance with input signals furnished by said first and second microcomputer circuits.

* * * * *